Dec. 1, 1964 T. J. WEIR 3,159,254
SPEED RESPONSIVE COUPLING DEVICE
Filed Jan. 11, 1962 2 Sheets-Sheet 1

INVENTOR.
THOMAS J. WEIR
BY
Lockwood, Woodard, Smith & Weikart
Attorneys

Dec. 1, 1964
T. J. WEIR
3,159,254
SPEED RESPONSIVE COUPLING DEVICE
Filed Jan. 11, 1962
2 Sheets-Sheet 2
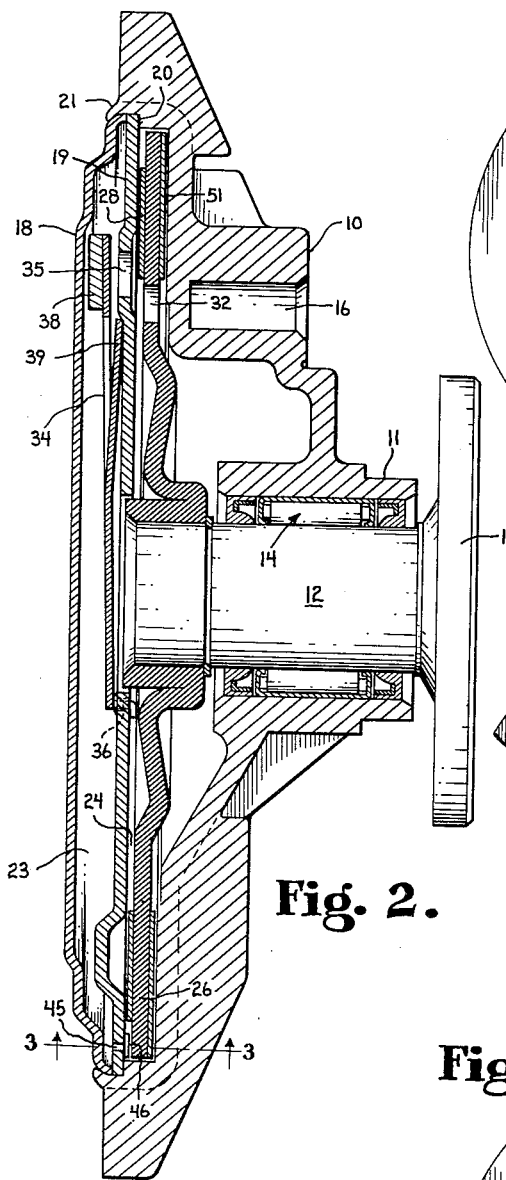
Fig. 2.
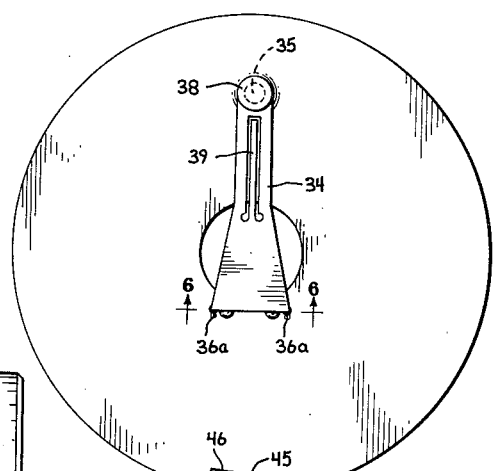
Fig. 5.
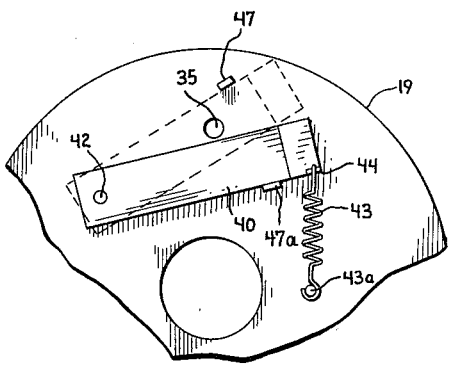
Fig. 7.
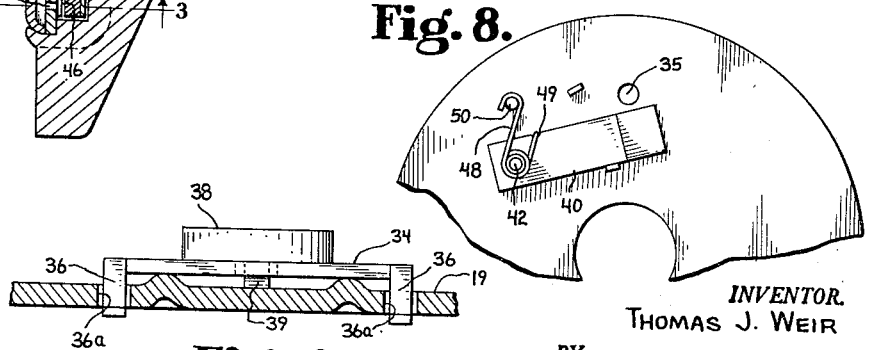
Fig. 8.
Fig. 6.
INVENTOR.
Thomas J. Weir
BY Lockwood, Woodard, Smith & Weikart
Attorneys

3,159,254
SPEED RESPONSIVE COUPLING DEVICE
Thomas J. Weir, Indianapolis, Ind., assignor to Schwitzer Corporation, Indianapolis, Ind., a corporation of Indiana
Filed Jan. 11, 1962, Ser. No. 165,527
4 Claims. (Cl. 192—58)

This invention relates generally to fluid coupling devices, and more particularly, to a fluid coupling adapted to drive an accessory device, such as a cooling fan, for an internal combustion engine.

Automotive vehicles, such as passenger automobiles and busses, are being provided with air conditioning equipment, the condensing element of such equipment being mounted in front of the cooling radiator of the engine. The air flowing through the condensing element is heated thereby and then flows through the cooling radiator of the engine thereby effecting the cooling characteristics of the radiator. Accordingly, the size of the cooling fan and its speed of rotation have been increased to provide adequate volume of cooling air. As a result, the parasitic load on the engine has been increased and the noise of fan operation has risen to an objectionable level.

To compensate for these effects, the cooling fan of the engine is provided with a fluid coupling device having temperature responsive means controlled either by the temperature of the air flowing through the radiator or by the temperature of the water circulating through the engine cooling system. The degree of coupling between the fan and the engine is controlled by the temperature responsive means to provide direct coupling of the fan to the engine when the air or the cooling water is at relatively high temperatures and to effect a certain degree of slip within the coupling to drive the fan at lower than normal speeds when the temperature of the air or cooling water is relatively low. This temperature variable coupling has the advantage of decreasing the power supplied to the fan by the engine when less air is needed for cooling purposes. This type of variable coupling also has the advantage that fan noise is decreased when fan speed is reduced.

Conventional temperature responsive fluid coupling devices of the type described are generally satisfactory except that the temperature responsive means usually consists of a bimetallic element mounted on the exterior of the casing of the fluid coupling device. Such bimetallic elements are relatively expensive and necessarily require the provision of means for coupling the bimetallic element to a valve means within the casing. The bimetallic elements usually project forwardly of the fluid coupling device, thus requiring space between the coupling device and the cooling radiator of the engine. In many installations space is at a premium in this area and, consequently, it would be desirable to provide a fluid coupling device having minimum axial dimensions. It is always desirable, in addition, to reduce the number of parts in fluid coupling devices thereby to decrease cost of manufacture.

The principal object of this invention is to provide a fluid coupling unit which includes means to control the degree of coupling therein in response to changes in the coupling speed.

Another object of this invention is to provide in a fluid coupling unit a valve mechanism for controlling the degree of coupling in response to changes in coupling speed.

Still another object of this invention is to provide a fluid coupling unit of relatively small size and inexpensive construction.

In accordance with this invention there is provided a fluid coupling element comprising a casing having a fluid reservoir therein and a fluid chamber for accommodating a driven disc, the casing being adapted to support an engine cooling fan or to be coupled to any desired form of accessory device, a valve mechanism operable to control flow of fluid between said reservoir and said chamber and speed responsive means coupled to said valve for controlling the opening and closing thereof, thereby to control the amount of fluid within said chamber and the degree of coupling between said disc and said casing in response to changes in coupling speed.

The full nature of the invention will be understood from the accompanying drawing and the following description and claims:

FIG. 2 is a cross section taken on line 2—2 of FIG. 1.

FIG. 5 is a side elevation in reduced scale taken from the left of FIG. 2 and illustrating the valve structure shown therein.

FIG. 6 is an enlarged cross section taken on line 6—6 of FIG. 5.

FIG. 7 is a fragmentary side elevation similar to FIG. 5 but illustrating a different modification of the valve structure.

FIG. 8 is a fragmentary side elevation similar to FIG. 5 and illustrating still another modification of the valve structure.

Figure 1:
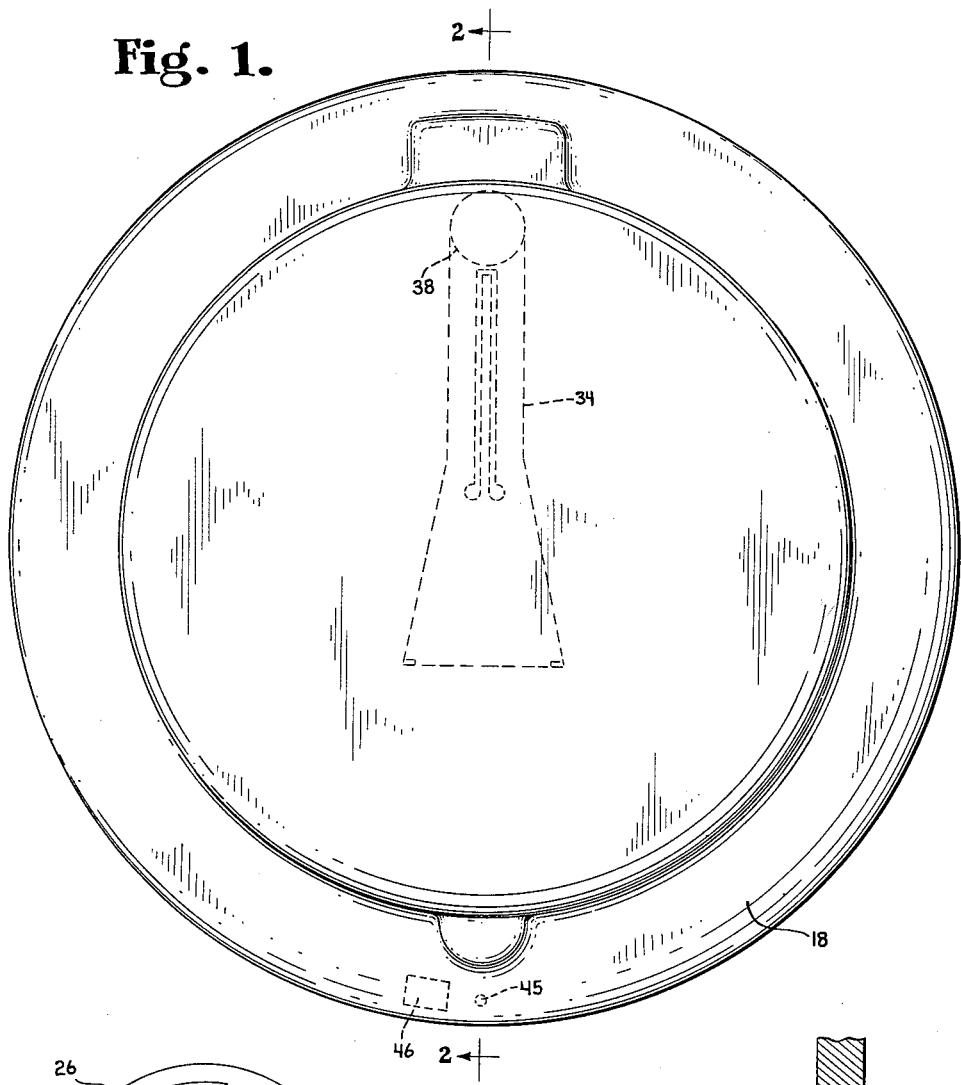
FIG. 1 is a front elevation of the fluid drive coupling device embodying this invention.
Figure 4:
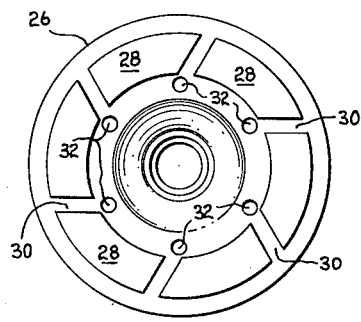
FIG. 4 is a side elevation in reduced scale of the drive disc 26 taken from the lefthand side of FIG. 2.
Figure 3:
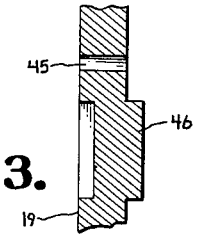
FIG. 3 is a partial cross section taken on line 3—3 of FIG. 2.

This invention comprises a fluid coupling unit comprising a casing member 10 having a hub 11 for rotatably mounting the casing on a drive shaft 12, there being a conventional sealed bearing assembly 14 for supporting the casing on the shaft. Shaft 12 may be integrally connected with a coupling flange 15 for coupling the drive shaft 12 to any convenient rotating part of an internal combustion engine. If the coupling unit is utilized for driving a cooling fan, the blades of the fan may be bolted to casing 10 by means of bolts threadedly engaging a plurality of radially disposed threaded bores 16 and the member 15 may be connected to the pulley which conventionally drives the engine water pump.

Casing 10 may be provided with a cover member 18, the peripheral edges of which engage the peripheral edges of a plate 19 seated on an annular surface 20 formed adjacent the periphery of casing 10. Cover member 18 and plate 19 may be clamped to casing member 10 by means of an annular flange member 21 swaged or otherwise formed into pressure engagement with the outer peripheral surface of cover 18. Cover 18 is formed and disposed to have spaced relation in respect to plate 19 thereby to provide a fluid reservoir 23 between cover 18 and plate 19. Casing 10 is formed to provide a recess inwardly of plate 19 thereby to provide a drive chamber 24 within which is mounted the drive disc 26. Shaft 12 carries disc 26 which may be press-fitted or otherwise fixed to the end of shaft 12 whereby rotation of shaft 12 causes disc 26 to rotate within chamber 24. The peripheral portions of disc 26 are covered with arcuate facing members 28 and 51 which may be spaced from one another to provide grooves or channels 30 extending between the outer portion of the facing members 28 and 51 inwardly the entire width of the facing members 28 and 51. Grooves 30 provide toroidal circulation of fluid because of the provision of ports 32 located at the inner ends of each one of the grooves 30. This means of providing toroidal circulation of fluid is fully described in my United States Letters Patent No. 2,879,755 granted March 31, 1959.

For controlling flow of fluid from reservoir 23 into chamber 24 there is provided an elongated valve member 34 extending at its outer end over a port 35 in the plate 19 and at its other end having finger members 36 seated in apertures 36a in plate 19. The finger members provide a pivot for valve 34 which is disposed 180° from the port 35 and on the opposite side of the center line of the shaft 12 in respect to port 35. The valve 34 includes a finger spring member 39 formed normally to engage plate 19 for biasing valve 34 toward an open position. Thus valve 34 is maintained in an open position when the housing is running at relatively slow speeds. The operation of the valve is accomplished by the centrifugal force at relatively high speeds acting thereon. Centrifugal force is exerted to overcome the force of the biasing spring to bring the valve 34 into a plane parallel with the mounting point of the valve to bring it toward and/or into a closed position. Thus, increases of drive housing speeds tend to reduce or cut off flow of fluid through port 35.

To make the valve member 34 more responsive to centrifugal force a weight or slug may be added to the outer extremity away from the pivot point. This may be a separate piece or formed from excess material on the end of the valve.

For providing flow of fluid out of the chamber 24 there is an aperture 45 in plate 19 adjacent the periphery thereof and opening into reservoir 23 and chamber 24. Thus, fluid may flow from reservoir 23 through port 35 into chamber 24 and from chamber 24 through port 45 into reservoir 23. In order to force flow of fluid through port 45, plate 19 is formed to provide a projecting surface 46 located immediately adjacent to port 45 and projecting into chamber 24 into close proximity to the peripheral surface of disc 26. It will be noted that the facing members 28, which are opposite to the inner surface of plate 19, do not extend all the way to the circumferential edge of disc 26 leaving a space opposite the projection 46. Thus, centrifugal force causes fluid to collect in this space in front of projection 46 creating pressure sufficient to force flow of fluid through port 45.

In operation, reservoir 23 may be filled with a fluid such, for example, as an oil to a degree sufficient to fill the spaces in chamber 24 between the opposing surfaces of the facings 28 and 51 and the adjacent walls of plate 19 and casing 10. A sufficient fluid is also required to maintain the same level in chamber 23 as that in chamber 24 during operation of the drive. If it is assumed that an engine is running at a relatively high speed the centrifugal force acting on valve 34 causes it to assume a substantially true radial position thereby closing port 35 preventing flow of oil from reservoir 23 into chamber 24. Therefore, after port 35 is closed the oil within chamber 24 will accumulate in the peripheral portion of chamber 24 and flow through port 45 into reservoir 23. There being no substantial amount of oil remaining in chamber 24 there is substantially no coupling from the drive shaft 12 through disc 26 and to casing 10. Thus, the accessory, such as the fan, attached to the casing 10 will be limited in speed since the position of the valve is a function of the housing speed. The valve controlling the fluid level in the working chamber thereby controls the torque capacity of the drive.

When the vehicle is operating at relatively low speeds the motion of the vehicle cannot create sufficient flow of cooling air through the engine radiator to properly cool the engine; therefore, a higher degree of coupling is required. This is accomplished due to the fact that at relatively low engine and coupling speeds the centrifugal force acting on the valve 34 to cause it to close is low, which results in the biasing spring finger 39 overcoming the lower centrifugal force, moving valve 34 away from port 35 thereby opening port 35. As port 35 opens, the oil in chamber 23, which had filled the chamber to a diameter smaller than a diameter formed by the outside of port 35, will move due to centrifugal force through port 35 into chamber 24. Centrifugal force causes oil entering chamber 24 to flow outwardly between the facing members 28 and 51 and the adjacent walls of chamber 24. The presence of oil in these spaces creates a coupling effect between disc 26 and casing 10 whereby the shaft 12 rotates the casing and the attached fan. A certain amount of oil will flow from chamber 24 back into the reservoir through port 45, but this amount is much less than the amount flowing through the much larger port 35 and, therefore, an adequate supply of oil remains in chamber 24 to effect the coupling function.

It will readily be apparent that a decrease in coupling speed will decrease the centrifugal force acting on valve 34 causing the valve to open to a degree proportional to decrease of engine speed. Similarly, the flow of oil through port 35 will increase in the same proportion, thus increasing the degree of coupling between the drive disc and casing. When the engine idles or coupling speed is low, the valve member 34 will move to a wide open position allowing full flow of oil through port 35 and creating a much greater degree of coupling between the drive disc and the casing. Thus, there is much less slippage between the drive disc and the casing, and the relative speed of the fan with respect to the speed of the drive shaft increases to a substantial extent and may even be equal to the speed of rotation of the drive shaft.

When the engine is speeded up to a higher driving speed and the coupling speed increases, the valve 34 will move to its closed position or to a partially closed position. Flow of oil into chamber 24 decreases or stops. The quantity of oil in chamber 24 then decreases by reason of flow of oil into the reservoir 23 through the port 45. This decreases the coupling between the driving disc and the casing causing the fan speed to decrease.

FIG. 7 illustrates a modified valve structure which comprises a valve member 40 for opening or closing the port 35. Member 40 is pivoted on pin 42 mounted in plate 19 and being on a radius to one side of the radius on which port 35 is located. Thus, centrifugal force tends to rotate valve 40 in a counterclockwise direction to close port 35. For restraining counterclockwise rotation of member 40 and holding it in the position shown in full lines at low coupling speeds, there is provided a biasing spring 43 hooked to member 40 at 44 and secured to plate 19 by pin 43a. For limiting the outward rotation of member 40 there is provided a stop member 47 mounted on plate 19. Stop member 47a on plate 19 limits the clockwise movement of member 40 under the influence of spring 43.

FIG. 8 illustrates a valve structure similar to that shown in FIG. 7 except that a coiled spring 48 is mounted on pin 42, one end being hooked to valve member 40 at 49 and the other end being hooked to a pin 50 mounted in plate 19.

The valve structures of FIGS. 7 and 8 respond to increases of coupling speed to close port 35 and such closure effects the coupling in the same manner as previously described in connection with the valve structure shown in FIG. 2 of the drawings. A decrease of coupling speed decreases centrifugal force acting on the valve member 40 whereby springs 43 or 48 cause valve member 40 to rotate in a clockwise direction to open port 35 to a degree proportionate to decrease of coupling speed. The degree of coupling then increases as previously described.

The invention claimed is:

1. A fluid coupling device comprising a driven shaft, an outer casing rotatably mounted on said shaft, said casing having a divider plate therein separating the space within said casing into a fluid reservoir and a drive chamber, a drive disc mounted on said shaft within said drive chamber, and including surfaces disposed in close face-to-face and spaced relation with surfaces of said plate and outer casing, a relatively large fill port in said plate opening into said reservoir and into said drive chamber for filling the spaces between said disc, plate and casing surfaces with fluid from said reservoir to create fluid drive coupling of said casing and said disc, a valve plate having a portion normally spaced from said port and pivotally mounted on said divider plate within said reservoir, the pivotal axis of said valve plate lying in a plane transverse to said shaft axis for movement of said valve plate into and out of seating relation with said port, spring means acting between said valve plate and said divider plate for biasing said valve plate out of said seating relation, and a weight mounted on said valve plate portion and responsive to centrifugal forces created by rotation of said casing for moving said valve plate to closed position over said fill port in response to increase of rotational speed, and permitting said spring means to move said valve plate to open said port in response to decrease of rotational speed to allow flow of fluid from said reservoir to said chamber, said divider plate having formed therein a relatively small drain port adjacent its periphery for draining fluid from said drive chamber to said reservoir.

2. A fluid coupling device comprising a driven shaft, an outer casing rotatably mounted on said shaft, said casing having a divider plate therein separating the space within said casing into a fluid reservoir and a drive chamber, a drive disc mounted on said shaft within said drive chamber, and including surfaces disposed in close face-to-face and spaced relation with surfaces of said plate and outer casing, a relatively large fill port in said plate opening into said reservoir and into said drive chamber for filling the spaces between said disc, plate and casing surfaces with fluid from said reservoir to create fluid drive coupling of said casing and said disc, a valve plate within said reservoir having a free end normally in open relation to said port and spaced axially thereof, and means pivotally supporting the other end of said valve plate on said divider plate for axial movement of said free end into closed relation with said port, said valve plate including a spring member bearing on said divider plate for normally biasing said free end to its normally open position and said valve plate having a mass responsive to increase or decrease of centrifugal force for moving the free end of said valve plate into closed or open relation to said port, said spring member and said valve plate being formed of a single piece of material.

3. A fluid coupling device comprising a driven shaft, an outer casing rotatably mounted on said shaft, said casing having a wall therein separating the space within said casing into a fluid reservoir and a drive chamber, a drive disc mounted on said shaft within said drive chamber, and including surfaces disposed in close face-to-face and spaced relation with surfaces of said casing and wall, a relatively large fill port in said wall opening into said reservoir and into said drive chamber for filling the spaces between said disc and casing surfaces with fluid from said reservoir to create fluid drive coupling of said casing and said disc, a valve plate member pivotally mounted within said reservoir extending over said port, the pivotal axis thereof lying in the plane of said wall and said valve plate member extending from its pivotal axis away from the plane of said wall at an angle to the plane of said wall with a portion thereof spaced from the plane of said wall, said spaced portion having a mass sufficient to respond to centrifugal force thereby to move said valve plate member between port opening and port closing positions, and means disposed between said valve plate member and said casing for biasing said valve plate member into one of said positions.

4. A fluid coupling device comprising a shaft, an outer casing rotatably mounted on said shaft, said casing having a wall therein and affixed thereto and separating the space within said casing into a fluid reservoir and a drive chamber, a drive member mounted on said shaft within said drive chamber, a fill port in said wall opening into said reservoir and into said drive chamber for filling the spaces between said drive member and casing surfaces with fluid from said reservoir to create fluid drive coupling of said casing and said drive member, and a valve plate member pivotally mounted at an angle to said wall within said reservoir, the pivotal axis of said valve plate member lying in a plane transverse to the axis of said shaft for movement of said valve plate member axially of said port into closing and opening relation to said port, resilient biasing means acting on said valve plate member in a direction parallel to said shaft axis to normally hold said valve plate member in said opening relation, said valve plate member including a portion of sufficient mass to respond to increasing centrifugal force thereby to overcome said resilient biasing means and move said valve plate member into said closing relation.

References Cited in the file of this patent
UNITED STATES PATENTS

| | | |
|---|---|---|
| 2,049,673 | Starr | Aug. 4, 1936 |
| 2,195,561 | Dickerson | Apr. 2, 1940 |
| 2,242,734 | Whittlesey | May 20, 1941 |
| 2,841,161 | Lee | July 1, 1958 |
| 2,902,127 | Hardy | Sept. 1, 1959 |
| 3,055,473 | Oldberg | Sept. 25, 1962 |